Patented Aug. 2, 1938

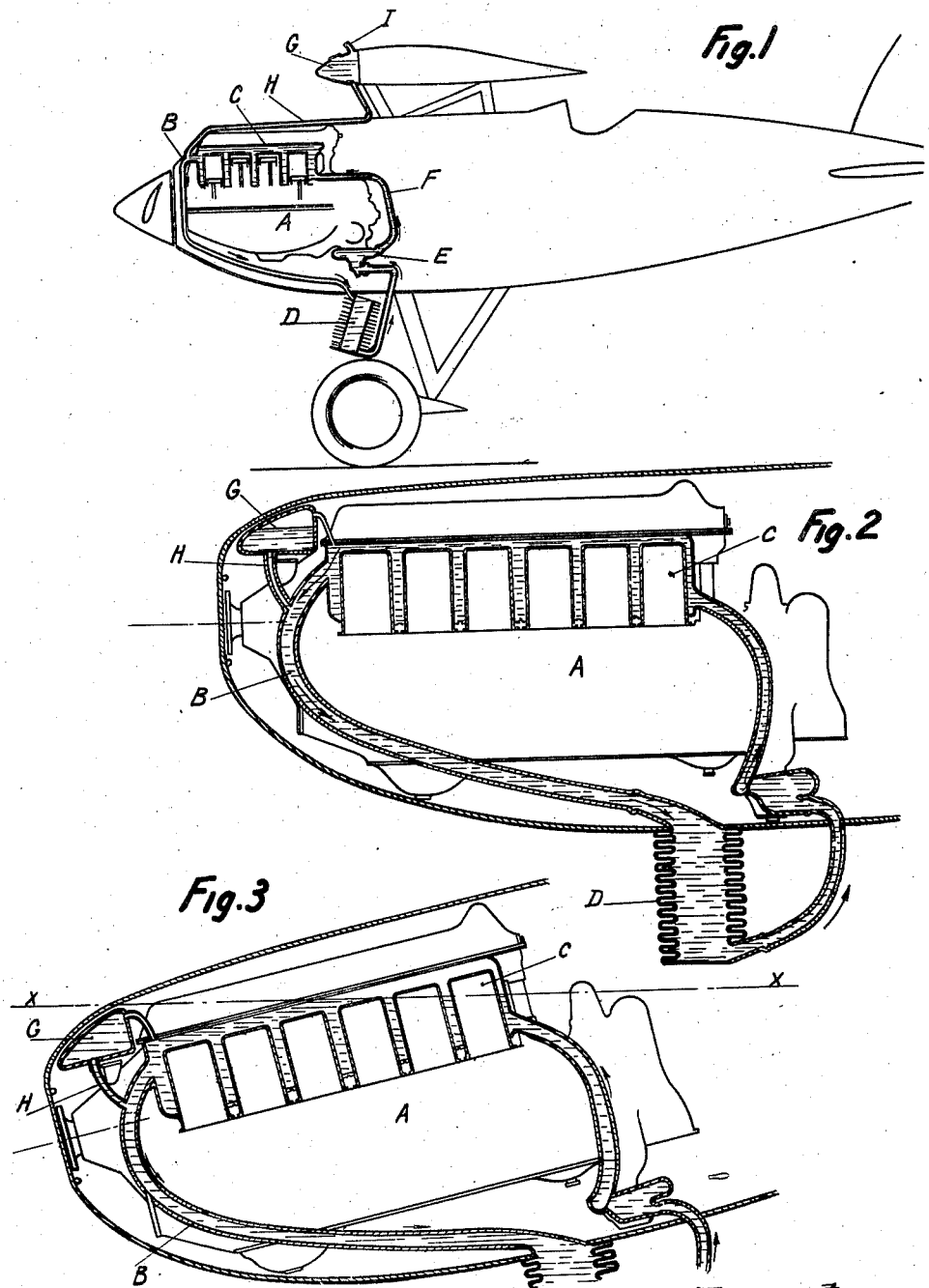

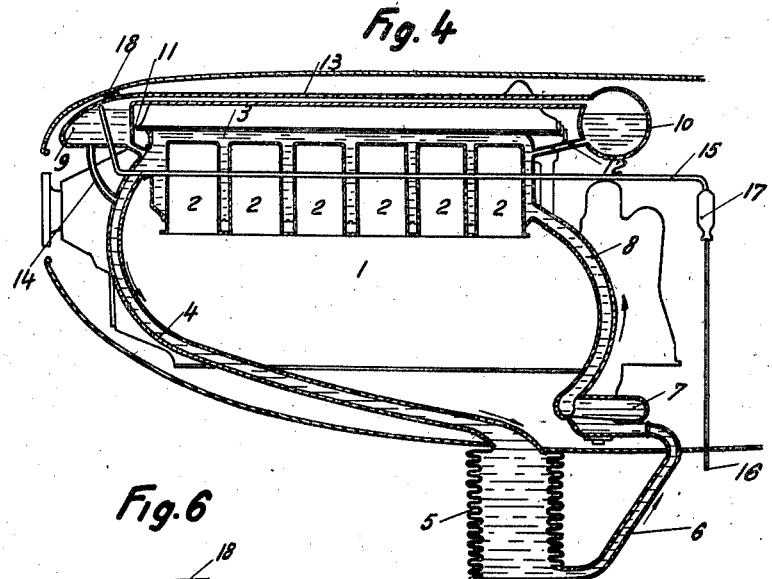
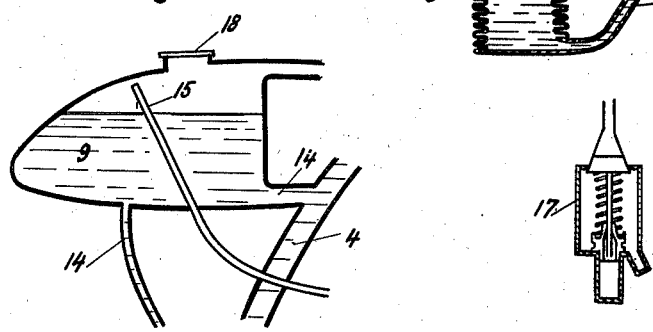
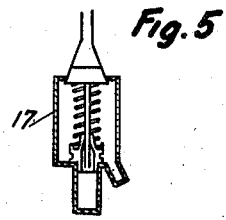
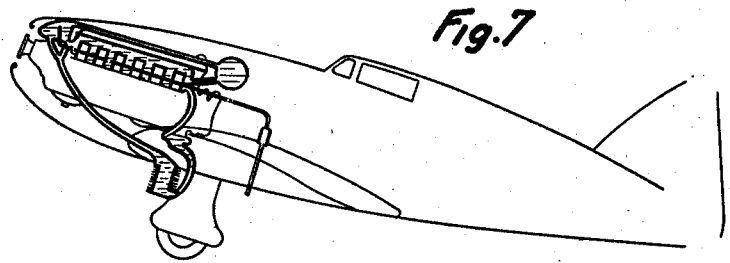
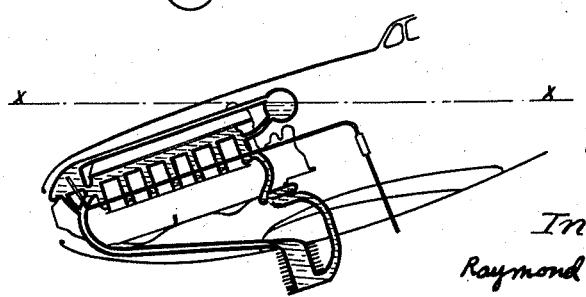

2,125,751

UNITED STATES PATENT OFFICE 2,125,751

LIQUID COOLING DEVICE FOR AIRCRAFT ENGINES

Raymond Saulnier, Paris, France

Application December 28, 1936, Serial No. 117,945
In France December 27, 1935

5 Claims. (Cl. 123—170)

(Granted under the provisions of sec. 14, act of March 2, 1927; 357 O. G. 5)

The present invention concerns improvements in liquid cooling devices for airplane engines, with a view to obtaining the constant presence of the liquid in question in all the parts of the engine, whatever be the position of the airplane. Of course the present invention can be applied to airplanes of all kinds but it is more especially applicable to the case of low-wing or cantilever airplanes.

It is known that the cooling elements, in the case of liquid cooled engines, are generally made, in high-wing monoplanes and biplanes, in the manner diagrammatically shown by Fig. 1 of the appended drawings. In this example, engine A includes one or several groups of cylinders C, a liquid circulation circuit including pipes B and F, a radiator D and a pump E. When, before starting the engine, all the pipes are filled with liquid, same as the cylinder jackets and the radiator, it is absolutely necessary that the jackets of group C should be filled up. However, when the liquid becomes heated and expands, it is absolutely necessary to provide an expansion space which is located above the cylinders. Usually, this expansion space consists of a small tank G, which will be called "feed chamber" in the following description. This feed chamber G is connected through a tube H with the cooling circuit and communicates with the atmosphere through a small pipe I. In high-wing monoplanes and biplanes, this feed chamber G is provided in the upper wing and therefore has a sufficient head for keeping the liquid level above the tops of the cylinders, whatever be the position of the airplane. If this condition were not complied with and the liquid level could drop below the upper point of cylinders C, the heads of said cylinders would cease to be immersed in the liquid and, consequently, would quickly heat up, risking to produce serious injuries of the engine.

In low wing monoplanes there is no high point, outside of the fuselage, permitting to place the feed chamber in the desired position. As, on the other hand, for aerodynamic reasons, the hood or fairing of the engine is always close to the cylinders, the feed chamber located in the fuselage of airplanes of this type, as shown by Fig. 2, may, under some conditions of flight, allow the upper liquid level to drop below the upper parts of the cylinders. In Fig. 3, such a case has been shown diagrammatically by way of example. In this figure, it is visible that, when flying along a downward path, the liquid present in the jackets of cylinders C fills up the whole of the volume of the feed chamber and uncovers the top of the rear cylinders of the group.

The object of the present invention is to provide a cooling device for airplane engines, and especially low-wing airplane engines, which permits the airplane to take any position without any risk of the level of the liquid uncovering the top of the cylinders that are to be cooled by said liquid. This device is arranged in such manner that the desired result is obtained without it being necessary to place the feed chamber in a high position which cannot be obtained in this kind of airplane.

According to the present invention, the cooling device includes, on the one hand, a feed chamber located at the front of the group of cylinders, substantially in the known manner disclosed by Figs. 2 and 3, and on the other hand a second feed chamber located at the rear of the group of cylinders and the upper part of which is connected with the upper part of the front feed chamber. The bottoms of both of these feed chambers are located substantially at the same level as the top of the group of cylinders and their upper parts at the same level as the highest part of the engine.

According to a preferred arrangement, the connection of the whole of the circulation system with the atmosphere is obtained through a tube starting from the top of the front feed chamber, extending toward the rear of the engine and opening outwardly under said engine, a suitable valve opening in an outward direction under the effect of a predetermined pressure, so as to control the exhaust of the vapours to the atmosphere.

A preferred embodiment of the present invention will be hereinafter described with reference to the accompanying drawings, given merely by way of example, and in which:

Figs. 1 to 3 show arrangements as used prior to this application;

Figs. 4 to 8 show the cooling device according to the invention, and in particular:

Fig. 4 shows the whole of the circulation system;

Fig. 5 shows a detail of the device for connecting the circulation circuit with the atmosphere;

Fig. 6 shows details of the front feed chamber;

Fig. 7 shows an airplane fitted with the cooling system according to the invention, said airplane being on the ground;

Fig. 8 is a diagrammatical view of this airplane flying along a downward path.

In these figures, reference character 1 designates an engine including cylinders 2. The cooling system includes the inside space 3 of the cylinder jackets, a tube 4 leading from the jackets, a radiator 5, a pipe 6, a pump 7 and a second pipe 8.

According to the present invention, the cooling circuit further includes a front feed chamber 9 and a rear feed chamber 10, both of these feed chambers communicating with the upper part of the circulation proper, respectively through pipes 11 and 12. These feed chambers communicate together through a pipe 13. The position of the feed chambers is determined by the height of the space provided for the engine, and it corresponds generally to the cover of the camshafts actuating the engine valves. When the system is filled with liquid, the level of said liquid is established in the manner diagrammatically shown by Fig. 4. The front feed chamber is preferably connected with tube 4 through a supplementary tube 14. The whole of the circulation system is connected with the atmosphere through a tube 15 leading from the upper part of front feed chamber 9, extending toward the rear of the engine and opening, as shown at 16, under said engine. In this tube is interposed a valve 17, which is shown more in detail in Fig. 5. This valve opens outwardly and is spring loaded in such manner as to open under the effect of a predetermined pressure. On the other hand, in order to avoid the crushing of the feed chambers, in the case in which the inner pressure would happen to drop below the outside pressure (case of an airplane flowing back to the ground after a flight at very high altitude), there is provided in the front feed chamber a valve 18 opening inwardly. This valve may be fitted in the plug serving to fill up the cooling system.

This device operates in the following manner: When the airplane is lying on the ground, it is, as shown in Fig. 7, in a position in which its front part is turned upwardly. The cooling system being filled with the amount of liquid necessary for ensuring the cooling, the rear feed-chamber is wholly filled with liquid and the front feed chamber has a part which is not filled with liquid, as shown in Fig. 7. In this position, as also shown by this figure, the jackets of the cylinders are wholly filled with liquid, which fully covers the tops of the cylinders. When the airplane is flying along an upward path, even vertically, the cylinder jackets are wholly filled, as it can easily be understood.

On the other hand, when the airplane is diving even vertically (see Fig. 8), the liquid present in the rear feed chamber fills the whole of the front feed chamber, and the level is X—X of Fig. 8, still covering the tops of the cylinders.

It is therefore clear that, with the device according to the present invention, there is no risk whatever of having the tops of the cylinders uncovered as the airplane is flying, and this without involving the necessity of placing any part above the normal outline of a low wing aeroplane.

Although the essential feature of the present invention is the provision of two feed chambers located one at the front and the other at the rear of the engine, said invention further includes a particularly advantageous device for connecting the circulation system with the atmosphere. This device includes the elements above mentioned.

The operation of this system for connecting the cooling circuit with the outside atmosphere takes place as follows:

The tube 15 starts from the top of the front feed chamber. This is because the vaporization and the excessive pressures resulting therefrom always take place when the airplane is climbing along a steep path, when the engine is working at full power and the airplane is flying at low speed. The steam then produced therefore accumulates in the front feed chamber. It is evacuated when the pressure becomes sufficient for producing the opening of valve 17. Pipe 15 evacuates only steam. This pipe 15 opens to the atmosphere behind the engine, as above stated, in order to avoid having valve 17 subjected to dynamic pressures due to stunt flying. This is because, this kind of flight, in the case of a valve located at the front, might produce opening thereof and therefore involve losses of liquid.

Finally, this pipe 15 opens below the engine and the radiator, in order to permit of flying upside down without producing a loss of liquid.

It should be well understood that the invention is not in any way limited to the example illustrated in the appended drawings and that it covers, in a very general manner, an engine cooling system including two feed chambers located one at the front and the other at the rear of the engine and which do not project from the highest point of the engine. The invention also covers an advantageous device for connecting the cooling device with the outside atmosphere, consisting of a tube leading from the top of the front feed chamber, extending in a substantially horizontal plane beyond the rear end of the engine and then opening vertically below said engine, a valve being interposed in the vertical part of the tube.

Finally, the invention includes, as a new structure, in a monoplane low wing engine provided with a water or liquid cooled engine, a liquid cooling system made as above described.

What I claim is:

1. In an airplane engine of the liquid cooled type, a cooling system which comprises, in combination, jackets for the cooling fluid surrounding the engine cylinders, a feed tank for the cooling liquid at the front end of the engine, a feed tank for the cooling liquid at the rear end of the engine, said feed tanks being so located and dimensioned as not to project upwardly beyond the highest point of the engine and being located above the engine cylinders, means for interconnecting the upper parts of said feed tanks, and means for connecting the respective lower parts of said feed tanks with said jackets.

2. In an airplane engine of the liquid cooled type, a cooling system which comprises, in combination, a circulation system including jackets for the cooling fluid surrounding the engine cylinders, a radiator and conduits connecting said jacket with said radiator, a feed tank for the cooling fluid at the front end of the engine, a feed tank for the cooling fluid at the rear end of the engine, said feed tanks being so located and dimensioned as to be located above the engine cylinders without projecting upwardly beyond the highest point of the engine, means for interconnecting the upper parts of said feed tanks, and means for connecting the respective lower parts of said feed tanks with said jackets.

3. A cooling system according to claim 2 which further comprises means for directly connecting the lower part of the front feed tank with the front part of said conduits.

4. In an airplane engine of the liquid cooled type, a cooling system which comprises, in combination, a circulation system including jackets for the cooling liquid surrounding the engine cylinders, a radiator, and conduits connecting said jackets and said radiator, a feed tank for the cooling liquid at the front end of the engine, a feed tank for the cooling liquid at the rear end of said engine, said feed tanks being so located and dimensioned as to be located above the engine cylinders without projecting upwardly beyond the highest point of said engine, means for interconnecting the upper parts of said respective feed tanks, means for connecting the respective lower parts of said feed tanks with said jackets, a pipe opening in the upper part of the front feed tank and extending first toward the rear beyond the rear end of the engine and then downwardly beyond the lowest point of said engine, and a spring valve on the downwardly extending portion of said pipe, adapted to open outwardly under the effect of a predetermined pressure in said front feed tank.

5. A cooling system according to claim 2 further including an inwardly opening safety valve provided on the front feed tank, so as to permit the inflow of air from the outside in case of a predetermined difference of pressure between the atmospheric pressure and the pressure in said feed tank.

RAYMOND SAULNIER.